Feb. 25, 1969  W. L. McGRATH  3,429,367
AIR CONDITIONING APPARATUS
Filed Sept. 20, 1965
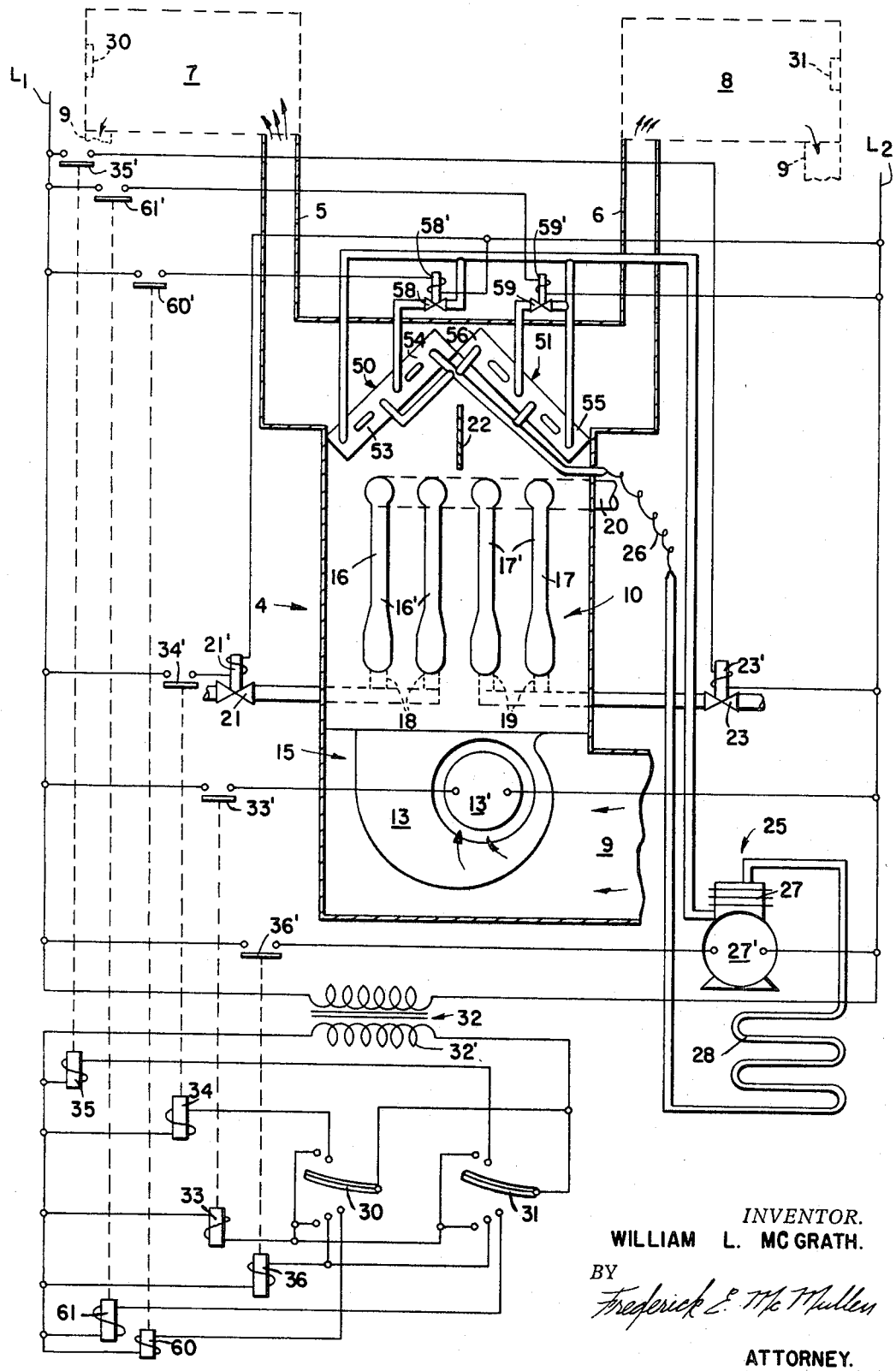
INVENTOR.
WILLIAM L. MCGRATH.
BY
Frederick E. McMullen
ATTORNEY.

United States Patent Office 3,429,367
Patented Feb. 25, 1969

3,429,367
AIR CONDITIONING APPARATUS
William L. McGrath, Syracuse, N.Y., assignor to Carrier Corporation, Syracuse, N.Y., a corporation of Delaware
Filed Sept. 20, 1965, Ser. No. 488,448
U.S. Cl. 165—26                              2 Claims
Int. Cl. F25b 29/00; F24f 3/00

ABSTRACT OF THE DISCLOSURE

Air conditioning apparatus for a plurality of individual zones in which heating means heat one part of an air stream being supplied to one zone while tempering a second part of the air stream being supplied to a second zone. Cooling coils are provided which permit cooler air to be distributed to one zone than the air distributed to the second zone when the zones require cooling rather than heating.

---

This invention relates to air conditioning apparatus and, more particularly, to an air conditioning apparatus adapted to heat and cool.

Where a number of individual zones, such as rooms, are to be conditioned by means of a central air conditioning unit under the control of zone thermostats, the varied conditioning demands presented by each zone may result in substantial variation in the conditions maintained in each zone. The conditioning demands peculiar to each zone are influenced, for example, by total window area, exposure, shading, wind effect, sun, internal effects, etc. While the conditioning demands inherent in each zone may, to a degree, be offset by engineering the installation of each conditioning unit, or through use of dampers or valves to regulate the flow of heat exchange medium to each zone in accordance with the demands of that zone, the cost and complexity of the air conditioning system, and the installation thereof, is increased.

It is a principal object of the present invention to provide a new and improved conditioning apparatus.

It is a further object of the present invention to provide a conditioning apparatus adapted to maintain predetermined environmental conditions in each of a plurality of zones.

It is an object of the present invention to provide an improved multizone conditioning apparatus capable of providing different degrees of conditioning to each zone in response to the individual demands of each zone to sustain preselected conditions within the several zones.

The invention relates to an air conditioning apparatus for use with a plurality of individual zones, comprising in combination, a fan effective when actuated to generate an air stream; heating means adapted to heat a first part of the air stream; first distributing duct means between the apparatus and at least one of the zones adapted to convey the air stream first part to the one zone; second distributing duct means between the apparatus and at least one other zone adapted to convey a second part of the air stream to the other zone, the heating means being adapted to temper the air stream second part; and control means responsive to conditions in the zones adapted on a demand for heat in the one zone to actuate the fan and the heating means whereby the apparatus heats the one zone while tempering the other zone.

Other objects will be apparent from the ensuing description and drawing in which the figure is a diagrammatic view showing the improved air conditioning apparatus of the present invention.

Referring to the drawing, conditioning apparatus 4 is operably connected, by means of suitable ducts 5, 6, with individual areas or zones 7, 8 to be conditioned. While the conditioning apparatus 4 is arranged in the exemplary showing to condition zones 7, 8, it is understood that additional zones may be served by the apparatus 4. And, while single ducts 5, 6 are shown communicating conditioning apparatus 4 with each of zones 7, 8, additional ducts may be employed where desired.

Conditioning apparatus 4 includes a suitable heating apparatus 10 and fan 13 jointly encased in a housing 15. Return air duct 9 communicates the suction side of fan 13 with the areas served, zones 7, 8. Heating apparatus 10 is comprised of paired heating means 16, 17 positioned adjacent one another. Heating means 16, 17 each comprise multiple heat exchange elements 16', 17', with burners 18, 19, respectively, therefor. Burners 18, 19 communicate with a suitable source of combustible medium, i.e. gas, through control valves 21, 23, respectively. A suitable ignition mechanism for firing burners 18, 19 (not shown) is provided. Flue 20 conveys products of combustion into the atmosphere.

Where desired, a baffle 22 may be provided downstream of heating means 10 to route conditioned air into ducts 5, 6, and limit the intermixture of air discharging from heating means 16 with the air discharging from heating means 17, and vice versa.

Conditioning apparatus 4 preferably incorporates a refrigeration system 25 for cooling zones 7, 8. It is understood that refrigeration system 25 may be omitted where cooling of zones 7, 8 is not desired. Refrigeration system 25 includes compressor 27, condenser 28, expansion means 26, and evaporator coils 50, 51 arranged in a closed refrigerant circuit. Evaporator coils 50, 51 are connected in parallel with one another in the refrigerant circuit and positioned within housing 15 downstream of heating means 10 so that each coil 50, 51 cools that part of the air stream entering ducts 5, 6, respectively. Ducts 5, 6 transmit the cooled air to zones 7, 8, respectively. Baffle 22, where used, facilitates divergence of the air stream prior to contact with coils 50, 51.

Coils 50, 51 are circuited by suitable refrigerant piping into sections 53, 54 and 55, 56, respectively. Refrigerant system valves 58, 59, when closed, interrupt the flow of refrigerant into sections 54, 56 of coils 50, 51, respectively. Valves 58, 59 each include a solenoid operator 58', 59' therefor. Solenoids 58', 59', when energized, open valves 58, 59, respectively, whereby the full cooling capacity of coils 50, 51 is employed. To regulate operation of conditioning apparatus 4 in response to the individual heating and cooling demands of each zone, thermostats 30, 31 are provided in zones 7, 8, respectively.

On a demand for heat in one zone, for example zone 7, thermostat 30 completes energizing circuits from secondary winding 32' of step-down transformer 32 to control relays 33, 34, respectively. The primary winding of transformer 32 is connected through leads $L_1$, $L_2$ with a suitable source of electrical power (not shown). When energized, relay 33 closes switch 33' to energize fan motor 13' through leads $L_1$, $L_2$. Relay 34 closes switch 34' to energize solenoid 21' of control valve 21. Solenoid 21' opens valve 21 to admit combustible medium to burners 18 of heating means 16, the ignition mechanism (not shown) firing burners 18 to render heating means 16 operative. Heating means 16 heats that portion of the stream of air generated by fan 13 flowing by and between heat exchange elements 16' thereof, the heated air passing through duct 5 to zone 7. Additionally, heating means 16, which is positioned next to heating means 17, warms or tempers air flowing by and between heat exchange elements 17' thereof, the tempered air passing through duct 6 to zone 8. Intermixture of heated air from heating means 16 with air flowing through heating means 17 contributes to the tempering or warming of the air entering duct 6, it being understood that the degree of intermixture is determined by the design of the air conditioning apparatus components, particularly baffle 22.

Should there be a demand for heat in the other zone, zone 8, thermostat 31 thereof energizes control relay 35. Relay 35 closes switch 35' to energize solenoid 23' of gas valve 23. Solenoid 23' opens valve 23 to admit combustible medium to burners 19 of heating means 17, the ignition mechanism firing burners 19 thereof to render heating means 17 operative. With heating means 16, 17 both operative, the air passing through conditioning apparatus 4 is substantially uniformly heated, ducts 5 and 6 conducting the heated air to zones 7, 8, respectively.

On a demand for cooling in one zone, for example in zone 7, thermostat 30 completes energizing circuits to control relays 33, 36 and 60. Relay 33, upon energization, closes switch 33' to energize fan motor 13' through leads $L_1$, $L_2$. Relay 36 closes switch 36' to energize motor 27' of compressor 27. Relay 60 closes switch 60' to energize solenoid 58'. Solenoid 58' opens valve 58 whereby cooling coil 50 operates at full cooling capacity. With valve 59 closed, cooling coil 51 operates at reduced cooling capacity inasmuch as section 56 thereof is closed to the flow of refrigerant. The portion of the air stream passing through evaporator coil 50 to duct 5 and zone 7 is, due to the greater cooling capacity of coil 50 relative to coil 51, cooler than the portion of the air stream passing through coil 51 to duct 6 and zone 8.

Should there be a demand for cooling in the other zone, zone 8, thermostat 31 completes an energizing circuit to control relay 61. Relay 61 closes switch 61' to energize solenoid 59', the solenoid 59' opening valve 59 whereby coil 51 operates at full capacity. The conditioning apparatus 4 accordingly operates at full cooling capacity to cool zones 7 and 8.

While I have described a preferred embodiment of my invention, it is to be understood that the invention is not limited thereto since it may be otherwise embodied within the scope of the following claims.

I claim:

1. In an air conditioning apparatus for use with a plurality of individual zones, the combination of a fan effective when actuated to generate an air stream, first distributing duct means between said apparatus and at least one of said zones for conveying a first part of said air stream to said one zone, second distributing duct means between said apparatus and at least one other zone for conveying a second part of said air stream to said other zone, heating means for heating the first part of said air stream while simultaneously tempering the second part of the air stream before the two parts are passed to said distributing duct means, control means responsive to conditions in said zones adapted on a demand for heat in said one zone to actuate said fan and said heating means to heat said one zone while tempering said other zone, second heating means adjacent said first heating means in the air stream for heating said air stream second part simultaneously with the air stream first part, said control means serving upon a heating demand in said other zone to actuate said second heating means and heat said second air stream part.

2. Air conditioning apparatus according to claim 1 including a refrigeration system having a refrigerant evaporating coil for each of said distributing ducts, said control means responding to a demand for cooling in one of said zones to actuate said fan and said refrigeration system whereby the air stream generated by said fan is cooled, each of said evaporating coils comprising first and second coil sections, said control means serving to render both sections of said coil treating air for said one zone operative while rendering operative only one section of said coil for each of said other zones whereby air distributed to said one zone is substantially cooler than air distributed to said other zones.

References Cited

UNITED STATES PATENTS

| | | | |
|---|---|---|---|
| 2,015,960 | 10/1935 | Norris | 236—11 |
| 2,023,622 | 12/1935 | Textorius | 165—20 |

ROBERT A. O'LEARY, *Primary Examiner.*

C. SUKALO, *Assistant Examiner.*

U.S. Cl. X.R.

165—48